(12) United States Patent
Laselva et al.

(10) Patent No.: US 11,582,214 B2
(45) Date of Patent: Feb. 14, 2023

(54) UPDATING SECURITY KEY

(71) Applicant: NOKIA TECHNOLOGIES OY, Espoo (FI)

(72) Inventors: Daniela Laselva, Klarup (DK); Suresh P. Nair, Whippany, NJ (US); Mika Rinne, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 930 days.

(21) Appl. No.: 16/338,195

(22) PCT Filed: Sep. 30, 2016

(86) PCT No.: PCT/US2016/054609
§ 371 (c)(1),
(2) Date: Mar. 29, 2019

(87) PCT Pub. No.: WO2018/063268
PCT Pub. Date: Apr. 5, 2018

(65) Prior Publication Data
US 2020/0029211 A1    Jan. 23, 2020

(51) Int. Cl.
*H04L 29/06* (2006.01)
*H04L 9/40* (2022.01)
(Continued)

(52) U.S. Cl.
CPC ....... *H04L 63/068* (2013.01); *H04W 12/0431* (2021.01); *H04W 24/08* (2013.01); *H04W 28/0252* (2013.01); *H04W 84/12* (2013.01)

(58) Field of Classification Search
CPC ............. H04W 12/0431; H04W 24/08; H04W 28/0252; H04W 84/12; H04W 88/06; H04L 63/068; H04L 43/0823; H04L 43/0894

See application file for complete search history.

(56) References Cited

U.S. PATENT DOCUMENTS

| 10,736,094 B2* | 8/2020 | Xu | H04W 72/0433 |
| 2009/0070650 A1* | 3/2009 | Bourlas | H04W 72/0466 |
| | | | 714/748 |

(Continued)

FOREIGN PATENT DOCUMENTS

| CA | 2729032 A1 * | 2/2010 | ......... H04L 65/1016 |
| CN | 102281535 A * | 12/2011 | ........... H04L 9/0827 |

(Continued)

OTHER PUBLICATIONS

Communication pursuant to Article 94(3) EPC dated Nov. 13, 2020 corresponding to European Patent Application No. 16781943.2.

(Continued)

*Primary Examiner* — Sher A Khan
(74) *Attorney, Agent, or Firm* — Squire Patton Boggs (US) LLP

(57) ABSTRACT

Certain embodiments provide a method of updating a security. The method can include monitoring a bearer that includes first and second radio accesses according to different radio technologies between user equipment and a communications network. One or more properties of the monitored bearer can be determined. An update of a security key utilized for securing communications over at least one of the radio accesses can be triggered in response to determining that the determined properties meet at least one triggering condition capable of indicating a need for the update.

19 Claims, 4 Drawing Sheets

(51) Int. Cl.
    *H04W 24/08*    (2009.01)
    *H04W 28/02*    (2009.01)
    *H04W 12/0431*    (2021.01)
    *H04W 84/12*    (2009.01)

(56) References Cited

U.S. PATENT DOCUMENTS

| | | | | |
|---|---|---|---|---|
| 2011/0158162 | A1* | 6/2011 | Mizikovsky | H04L 63/0892 370/328 |
| 2013/0114813 | A1 | 5/2013 | Chai | |
| 2015/0029892 | A1* | 1/2015 | Cha | H04L 43/10 370/253 |
| 2015/0043492 | A1* | 2/2015 | Baek | H04W 56/0005 370/329 |
| 2015/0110048 | A1* | 4/2015 | Damnjanovic | H04W 76/16 370/329 |
| 2015/0124708 | A1* | 5/2015 | Blankenship | H04W 36/08 370/329 |
| 2015/0208235 | A1* | 7/2015 | Ingale | H04W 74/0833 455/411 |
| 2016/0285604 | A1* | 9/2016 | Larsson | H04L 5/005 |
| 2017/0125021 | A1* | 5/2017 | Garre | G10L 19/002 |
| 2017/0134171 | A1* | 5/2017 | Woxland | H04W 12/086 |
| 2017/0171748 | A1* | 6/2017 | Deng | H04W 76/30 |

FOREIGN PATENT DOCUMENTS

| | | | |
|---|---|---|---|
| CN | 102281535 | A | 12/2011 |
| CN | 104936174 | A | 9/2015 |
| EP | 2922326 | A1 * 9/2015 | ............ H04L 29/06 |
| EP | 2922363 | A1 * 9/2015 | ............ H04W 76/15 |
| EP | 2950591 | A1 * 12/2015 | ............ H04L 63/10 |
| WO | WO-2005102017 | A2 * 11/2005 | ........... H04L 63/062 |
| WO | WO-2011085682 | A1 * 7/2011 | ........... H04L 63/062 |
| WO | WO-2014182911 | A1 * 11/2014 | ......... H04B 7/0417 |
| WO | WO 2015/066385 | A2 5/2015 | |
| WO | WO 2016/126029 | A1 8/2016 | |

OTHER PUBLICATIONS

International Search Report & Written Opinion dated Nov. 18, 2016 corresponding to International Patent Application No. PCT/US2016/054609.

3GPP TS 33.401 V13.3.0 (Jun. 2016), Technical Specification, 3rd Generation Partnership Project; Technical Specification Group Services and System Aspects; 3GPP System Architecture Evolution (SAE); Security architecture (Release 13), Jun. 23, 2016, pp. 1-148, XP051123425.

Notification of the First Office Action dated Apr. 26, 2021 corresponding to Chinese Patent Application No. 2016800909702, with English Summary thereof.

Notification of Second Office Action dated Jan. 18, 2022 corresponding to Chinese Patent Application No. 2016800909702, with English summary thereof.

Notification of Third Office Action dated Jul. 26, 2022 corresponding to Chinese Patent Application No. 2016800909702, with English summary thereof.

* cited by examiner

Legend:
110 Device
120 Base Station
130 Access Point
140 Core Network

UPDATING SECURITY KEY

FIELD

The present disclosure relates to updating security key of at least one bearer comprising multiple radio accesses.

BACKGROUND

Wireless communication may be conducted using, in general, cellular and/or non-cellular technologies. Cellular technologies include, for example, wideband code division multiple access, WCDMA, long term evolution, LTE, and 5G. Non-cellular technologies include, for example, wireless local area network, WLAN, and worldwide interoperability for microwave access, WiMAX. The WLAN typically is used to refer to WLANs that are compliant to IEEE 802.11 family of standards.

In wireless communication, a wireless connection between user equipment, UE, and a base station, or access point, may be arranged to convey information in the uplink and downlink. The uplink direction proceeds from the user equipment toward the network, and the downlink direction proceeds from the network toward the user equipment. A base station is a term used in connection with cellular technologies, while access point is a term employed frequently when discussing non-cellular technologies.

Some user equipment, such as smartphones, has the ability to select a technology to use from a plurality of available choices. For example, to download a large file, a smartphone may choose to select a non-cellular technology, and to place a voice call the same smartphone may choose to select a cellular technology. Non-cellular technologies may offer high data rates, while cellular technologies may be designed to support mobility and guaranteed quality of service.

Information communicated over cellular or non-cellular connections may be ciphered. Ciphering may alternatively be referred to as encryption. Ciphering may take place at one or more processing layers, for example, an application may employ end-to-end ciphering, a network transport protocol may employ ciphering, an intermediate protocol layer may employ ciphering and an air interface may employ a further, separate ciphering, resulting in data communicated over the air interface that may be ciphered more than once, using different algorithms and keys. In wireless links of transmission, ciphering cannot be compromised, despite of possible other levels of security provided for communication.

Ciphering keys should be updated in order to maintain sufficient security in communications. Frequent updating of the security keys may cause interruptions to the communications, but on the other hand infrequent updating of the keys makes the communications vulnerable to attacks. Moreover, ciphering practices may depend on the wireless communications technology utilized on the air interface and for each wireless communications there may be various ciphering practices available.

In communications, where more than one wireless communications technology is utilized on wireless links over the air interface, security key updating can interrupt communications of all the wireless links. Therefore, updating ciphering keys involving different wireless communications technologies is particularly important

SUMMARY OF THE INVENTION

The invention is defined by the features of the independent claims. Some specific embodiments are defined in the dependent claims.

According to a first aspect of the present invention, there is provided an apparatus comprising a memory for storing program code and at least one processing core capable of executing the program code to cause monitoring at least one bearer comprising a first and second radio accesses according to different radio technologies between user equipment and a communications network, determining one or more properties of the monitored bearer, and triggering an update of a security key utilized for securing communications over at least one of the radio accesses in response to determining that the determined properties meet at least one triggering condition capable of indicating a need for the update.

According to a second aspect of the present invention, there is provided a method comprising, monitoring at least one bearer comprising a first and second radio accesses according to different radio technologies between user equipment and a communications network, determining one or more properties of the monitored bearer and triggering an update of a security key utilized for securing communications over at least one of the radio accesses in response to determining that the determined properties meet at least one triggering condition capable of indicating a need for the update.

According to a third aspect of the present invention, there is provided an apparatus comprising means for monitoring at least one bearer comprising a first and second radio accesses according to different radio technologies between user equipment and a communications network, means for determining one or more properties of the monitored bearer and means for triggering an update of a security key utilized for securing communications over at least one of the radio accesses in response to determining that the determined properties meet at least one triggering condition capable of indicating a need for the update.

According to a fourth aspect of the present invention, there is provided a non-transitory computer readable medium having stored thereon a set of computer readable instructions that, when executed by at least one processor, cause an apparatus to at least monitoring at least one bearer comprising a first and second radio accesses according to different radio technologies between user equipment and a communications network, determining one or more properties of the monitored bearer and triggering an update of a security key utilized for securing communications over at least one of the radio accesses in response to determining that the determined properties meet at least one triggering condition capable of indicating a need for the update.

According to a fifth aspect of the present invention, there is provided a computer program configured to cause a method in accordance with the second aspect of the present invention.

Various embodiments of the first, second, third, fourth and fifth aspects may comprise at least one feature from the following bulleted list:

- the one or more properties comprise at least one of an invalid bearer mapping, irregularity of sequence numbers, higher than expected arrival rate of data, high error rate, an abnormality at a wireless local area network termination associated with a base station, an abnormality at tunnel endpoint in a core network node, an amount of data, a change of frequency band over a radio access, an event, a radio access event, a mobility set event, a bearer configuration, a time since a previous update of the security key and session duration, and a failed integrity check
- the update of a security key is triggered periodically, when at least one uplink bearer is configured the update of a security key is triggered if a session over the radio accesses lasts longer than a threshold, when only downlink bearers are configured the update of a security key is triggered in response to report from user equipment, said report indicating invalid mapping of packets to active flows the update of a security key is triggered in response to report from a tunnel endpoint in the core network, said report indicating invalid mapping of packets to active flows information is sent to a wireless local area network termination, said information comprising at least one of flow direction and bearer configuration a level of trust of the at least one radio access is determined on the basis of the radio access being provided by a third party access point or a private access point and a frequency of updating the security key is adapted on the basis of the determined level of trust of the at least one radio access an amount of data over the at least one radio access is determined and a frequency of updating the security key is adapted on the basis of the determined amount of data the bearer comprises at least one of a radio bearer and a core network bearer.

the radio accesses comprise a cellular radio link and a non-cellular radio link for example Wireless Local Area Network radio link the bearer comprises at least one of a radio bearer and a core network bearer the apparatus is an Evolved NodeB.

EMBODIMENTS

In connection with more than one radio access according to different radio technologies between user equipment and radio access network, a bearer comprising at least one of the radio accesses is monitored for determining properties of the monitored bearer. A security key is utilized for securing communications on at least one of the communications links. A security key update is triggered in response to determining that the determined properties meet at least one triggering condition capable of indicating a need for the update. A benefit of this is that security over the radio accesses utilizing the security key may be controlled for maintaining a sufficient level of security while avoiding too frequent updating of the security key.

Figure 1:
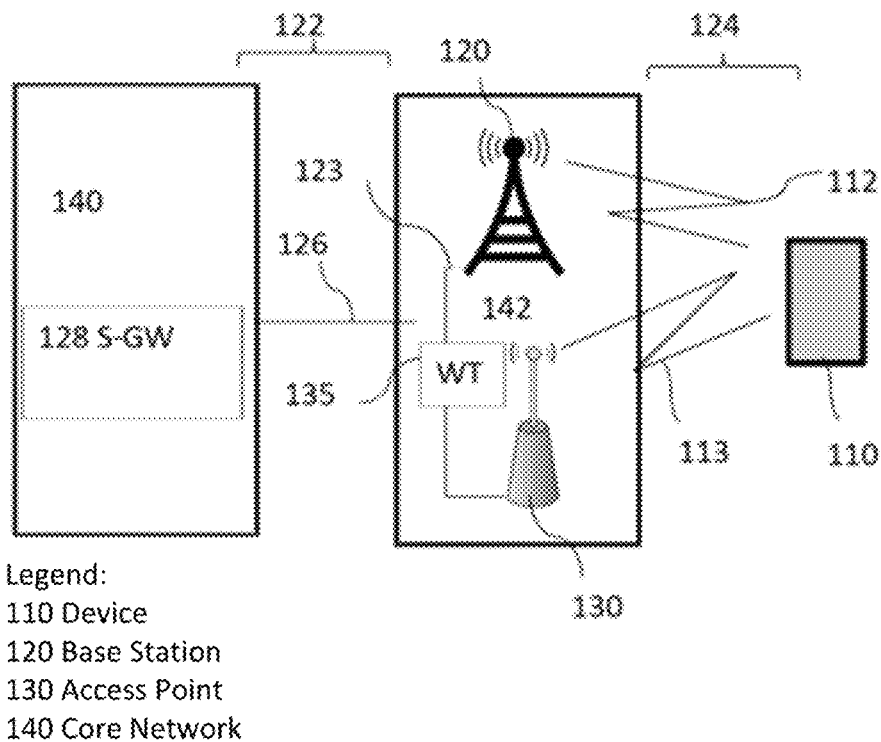
FIG. 1 illustrates an example system in accordance with at least some embodiments of the present invention.

FIG. 1 illustrates an example system in accordance with at least some embodiments of the present invention. The system of FIG. 1 comprises a device 110 connected to a communications network 140, 142 by one or more bearers 122, 124. The bearers may comprise a radio bearer 124 and a core network bearer 122. The bearers may be uplink or downlink bearers. The radio access bearer may comprise one or more radio accesses 112, 113 provided between the device 110 and a radio access network 142 of the communications network. The radio accesses may comprise capabilities to communicate information over corresponding radio links. The capabilities may be provided both in the radio access network 142 and the device 110. Examples of the capabilities may comprise hardware and/or software that may implement procedures specific to each radio access. Procedures specific to each radio access may be implemented by a protocol stack comprising one or more protocol layers, for example a physical layer and a link control layer. Accordingly, having the capabilities to communicate over the radio links provides that the radio links corresponding to the radio accesses may be established for transmission of information over the radio links. The radio accesses and corresponding radio links may be of different radio technologies. The radio links may be configured to the bearer to be utilized in transmissions of information at the same time or switchingly, whereby in the latter case the radio links may be utilized one at a time. The radio technologies may comprise cellular and/or non-cellular technologies. The core network bearer may be provided between the device 110 and a core network 140 of the communications network.

The device 110 may comprise user equipment (UE) such as a smartphone, tablet device, smart watch, a machine, an Internet Thing or other suitable device. Device 110 may be furnished with a capability to communicate via one or more radio links of different radio technologies. Accordingly, the radio access network of the communications network may comprise radio access nodes capable of operating according to the different radio technologies of the radio links. Examples of the radio access nodes comprise a base station 120 and an access point 130.

The communications network may utilize aggregation of radio links, wherein more than one radio link may be employed simultaneously to communicate information between the radio access network 142 and the device 110. It is also feasible to communicate information on one of the links out of more than one radio link at a time between the radio access network and the device. The carriers may be of same or differing types, and similar or differing frequency bands may be used to communicate over the carriers joined together in aggregation. The expression "dual connectivity" may be used to refer to aggregation of carriers controlled by different base stations. Carrier aggregation is used for example in LTE-Advanced that is a mobile communication standard and a major enhancement of the LTE standard, both being standards by the 3rd Generation Partnership Project, 3GPP.

In an example, the radio accesses 112, 113 may comprise a cellular radio link according to a cellular technology and a non-cellular radio link according to a non-cellular technology. Each of the radio links may have a radio frequency carrier, where transmissions of information such as data are performed. For example, transmissions of information n may take place simultaneously on both the cellular and non-cellular part for the same radio bearer 124. For another example, transmissions of information may take place switchingly on either the cellular or non-cellular part for the same radio bearer. Accordingly, the non-cellular part of the bearer may be switched to the cellular part or vice versa.

Device 110 and the radio may be configured to employ aggregation of carriers of the radio links wherein one carrier of the aggregation is a carrier on one of the radio links and another carrier of the aggregation is a carrier on another radio link of the radio links. In here, aggregation of carriers further includes switching of carriers of the radio links wherein one carrier of the aggregation of switching is a carrier on one of the radio links and another carrier of the aggregation of switching is a carrier on another radio link of the radio links. Accordingly, in an example the one carrier may be a cellular carrier and another carrier may be a non-cellular carrier.

In the system of FIG. 1, device 110 may have a first radio link with one base station according to the first radio access 112. The base station may be a cellular base station 120, the first carrier being a cellular carrier. The first radio link and base station 120 may be arranged to operate in accordance with LTE, 5G or WCDMA technology, for example. In the LTE the base stations are referred to as evolved NodeBs (eNBs). Device 110 may have a second radio link with access point 130 according to the second radio access 112. Access point 130 and the second radio link may be arranged to operate in accordance with a non-cellular technology such as WLAN, for example. First radio link and second radio link may be comprised in a same aggregation of the radio links.

Access point 130, may be located away from base station 120 or be co-located with base station 120. The base station and the access point may have communications ranges, where the base station and the access points may be capable of communicating with the device 110. The communications ranges may be referred to as cells. Accordingly, when the device 110 is within a cell, the device may be capable of communications with the base station or the access point. It should be appreciated that the device 110 may be within cells of more than one base station and/or access point, whereby the device may be capable of communicating with more than none base station and/or access point that correspond to the cells An interface 123 enables communications between base station 120 and access point 130. In some embodiments, a WLAN termination 135, WT, node is disposed between base station 120 and access point 130. Interface 123 may comprise an Xw interface, for example, where the aggregation is LTE-WLAN, LWA, aggregation. An Xw interface interconnects a base station and a WT node. A WT node may be co-located with an access point, and/or WT functionality may be comprised in an access point. WT functionality may be in an access controller or in any other network element or it may be abstracted to a cloud. WT may consist of a security gateway. Interface 123 may carry both control and data plane traffic. Interface 123 may be arranged to convey traffic using GPRS tunneling protocol for user plane, or any of its versions (like v2), GTP-u, over UDP, for example. Another example of a tunnel protocol may be used such as Generic Routing Encapsulation (GRE), or its different versions (like v2), specified by IETF. An IPsec tunnel may be established between base station 120 and device 110, via access point 130. Security keys, for example IPsec keys, or other keys, may be derived by base station 120 and device 110, for example based on key $K_{eNB}$. The security keys may be utilized in securing the radio accesses by deriving ciphering keys from the $K_{eNB}$ for ciphering information transmitted over the radio links. Base station 120 may be further connected to the core network 140 via interface 126. For example, interface 126 may connect to a MME or S-GW 128 in case the cellular technology is LTE. Base station 120 may thus provide information to device 110 over the radio links by transmitting a part of the information via first radio link according to the first radio access 112, and by providing another part of the information, via interface 123, to access point 130 for transmission to device 110 via second radio link according to the second radio access 113.

In the uplink direction, device 110 may provide information over the radio links by transmitting at least part of the information to base station 120 via first radio link, and at least part of the information to access point 130 via second radio link. Access point 130 will then forward, via interface 123, the part of the information, received in access point 130 via second carrier, to base station 120. The information may comprise user plane data and control plane data, for example.

First radio link according to the first radio access 112 may employ an air interface ciphering in accordance with a technology, for example cellular technology, used in first radio link. Likewise, second radio link according to the second radio access 113 may employ an air interface ciphering in accordance with another technology, for example non-cellular technology, used in second carrier. Further, base station 120 may perform ciphering of information before providing it to interface 123 and/or first radio link. Such ciphering, which may thus take place in addition to the air interface ciphering on the second radio link, may comprise intermediate-level ciphering, such as packet data convergence protocol, PDCP, and/or IPSec ciphering. Intermediate-level ciphering may thus comprise ciphering that is performed in a protocol stack between application level ciphering and air interface ciphering. In one example the intermediate level ciphering may be PDCP ciphering performed for the first radio link.

Aggregation of cellular and non-cellular radio links may be controlled by base station 120. Controlling may comprise activation and deactivation of aggregating the cellular and non-cellular radio links, for example. Base station 120 may configure a WLAN mobility set for device 110, for example based on WLAN measurements performed by device 110. A WLAN mobility set may comprise a set of access point identifiers, wherein mobility within the mobility set may be controlled by device 110. Access points comprised in a mobility set may have interfaces with each other, enabling mobility within the mobility set to be transparent to base station 120.

Device 110 may perform measurements to support aggregation of radio links. The measurements may comprise non-cellular measurements, such as for example WLAN measurements. For example, signal strengths from access points may be compared to thresholds to determine access points or access point sets that are usable. The measurements may also comprise cellular measurements, for example measurements usable in planning handovers between base stations.

Access point 130 may act under the direction of base station 120, without needing to communicate with a core network 140 of the communications network. The aggregation of radio links may be used in the downlink only direction, or both in downlink and uplink. In carrier aggregation, data transmitted via access point 130 may be encapsulated in LWA adaptation protocol, LWAAP, format, which may carry a bearer identity. LWIP encapsulation protocol, LWIPEP, may carry a bearer ID in case of LWIP. LWIP comprises LTE-WLAN radio level integration with IPsec tunnel.

A bearer 122, 124 may refer to any form of bearer as described in the 3GPP specifications. On the other hand a bearer may refer to the handling of a set of flows or a session consisting of Protocol Data Units of a packet network. Such sessions can for example include data of IP packet network of Ethernet or from a non-IP packet network. In one example, a bearer may refer to a one or multiple data flows capable of carrying user data. Accordingly, the bearer may be specific to the user equipment. The data flows may be referred to sessions. The user data may be IP data packets for example. The bearer may have an identifier, for example data radio bearer identifier and a tunnel identifier, for example GTP tunnel identifier. A radio bearer is capable of transporting user data between the device 110 and the base station 120 over the first radio link and/or the second radio link. User data over the second radio link is transported via the WT and interface 123

Figure 2:
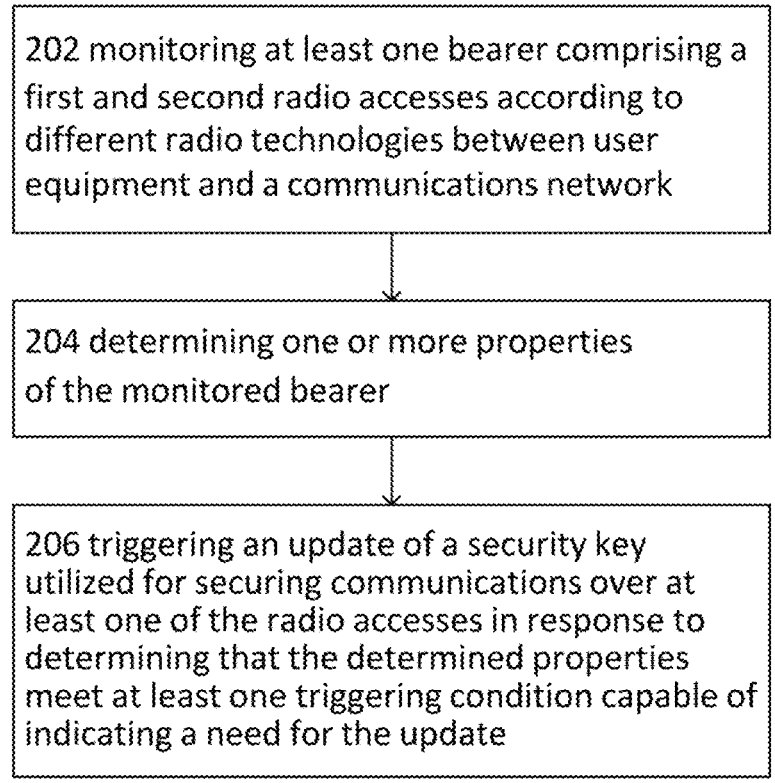
FIG. 2 is a flow graph of method in accordance with at least some embodiments of the present invention.

FIG. 2 is a flow graph of a method in accordance with at least some embodiments of the present invention. The phases of the illustrated method may be performed in a base station 120, in a node connected to base station, or in a control device configured to control the functioning of the baser station or the node connected to the base station. In one example the node connected to the base station may be a WT.

Phase 202 comprises monitoring at least one bearer comprising a first and second radio accesses according to different radio technologies between UE and a communications network. Phase 204 comprises determining one or more properties of the monitored bearer. Phase 206 triggering an update of a security key utilized for securing communications on at least one of the radio accesses in response to determining that the determined properties meet at least one triggering condition capable of indicating a need for the update. Since the security key is updated, security over the radio accesses utilizing the updated security key may be controlled for maintaining a sufficient level of security while avoiding too frequent updating of the security key.

In some embodiments, more than one bearer, for example two bearers, may be monitored and the radio accesses are arranged into different bearers.

In an embodiment the triggering may cause updating the security key for one radio access on the basis of the base key for securing communications on another radio link. In this way security of one radio link may benefit from the security on another radio link.

In an embodiment, the radio accesses may comprise a cellular radio link and a non-cellular radio link for example Wireless Local Area Network radio link. When the update of the security key utilized on the non-cellular radio link is triggered, a new security key for the communications over the non-cellular radio link may be generated. On the other hand the update of the security key utilized on the cellular radio link may be triggered and a new security key for the communications over the cellular radio link may be generated. Accordingly, the updating of the security key may be controlled for maintaining a sufficient level of security on the cellular and/or non-cellular radio link while avoiding too frequent updating of the security key.

In one example $K_{eNB}$ may be used as base key for the secure communication between UE and eNB. $K_{eNB}$ itself may be generated from $K_{ASME}$ which originates by the cellular network security management entity which creates top-level keys for the access network. On triggering 206 the security key update, $K_{eNB}$ may be used to derive a new base key $S\text{-}K_{WT}$ for WLAN radio link on the basis of WT counter and $K_{eNB}$ using a Key Derivation Function as defined in more detail in Sections G.2.4 and G.2.5 in 3GPP TS 33.401 V13.3.0 (2016-06); 3rd Generation Partnership Project; Technical Specification Group Services and System Aspects; 3GPP System Architecture Evolution (SAE); Security architecture (Release 13).

On a cellular radio link, the IP packet may be processed by protocol stack comprising a PDCP protocol, RLC protocol and a cellular MAC protocol. On a non-cellular radio link, the IP packet may be processed by protocol stack comprising a non-cellular MAC protocol. The non-cellular radio link may be a WLAN radio link.

Preferably, at least one of the radio accesses has an air interface protocol employing ciphering. Accordingly, ciphered obtained information is transmitted over the radio link employing ciphering on air interface protocols. An air interface protocol employing ciphering may be e.g. PDCP.

Figure 3:
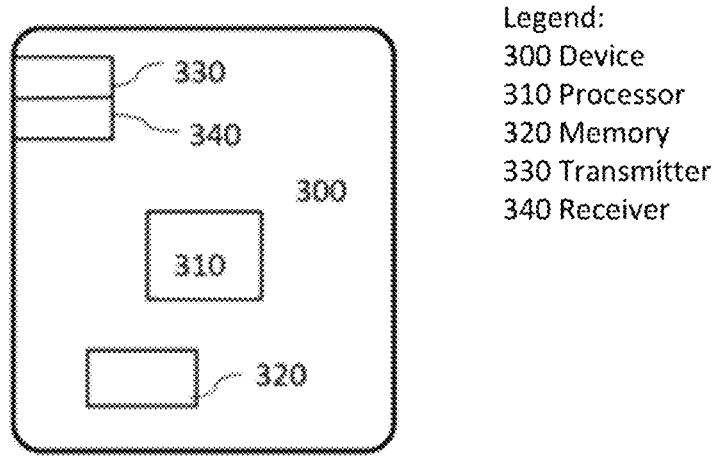
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a base station such as base station of FIG. 1, or a WT connected to the base station. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise for example Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330 and/or receiver 340 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
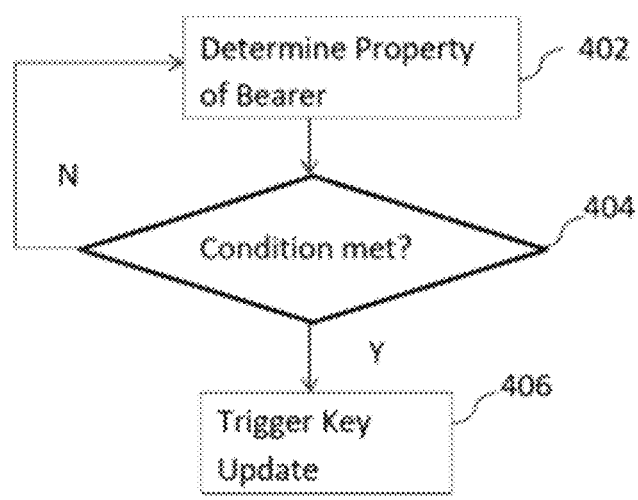
FIG. 4 illustrates an example of triggering an update of a security key in accordance with at least some embodiments of the present invention.

FIG. 4 illustrates an example of triggering an update of a security key in accordance with at least some embodiments of the present invention. The phases of the illustrated method may be performed in a base station 120, in a node connected to base station, or in a control device configured to control the functioning of the baser station or the node connected to the base station. In one example the node connected to the base station may be a WT. The method of FIG. 4 may be used in implementing one or more of the phases 204 and 206 of the method described with FIG. 2.

Phase 402 comprises determining at least one property of the monitored bearer. This phase may correspond to phase 204 described with FIG. 2. Phase 404 comprises checking if the determined property meets at least one triggering condition capable of indicating a need for the update. Phase 406 comprises triggering an update of a security key if the determined property meets the at least one triggering condition. The security key update may be performed as described above with FIG. 2 phase 206. The method may continue from phase 404 to phase 402 for determining at least one property of bearer, if the determined property fails to meet the at least one triggering condition. In one example the property may meet the triggering condition at least when the property and the triggering condition are substantially the same. In another example the property may meet the triggering condition, when the property is less or greater than the triggering condition. In yet another example property may meet the triggering condition, when the property is not equal to the triggering condition.

In some embodiments, the properties of the bearers may comprise one or more from the following: an invalid bearer mapping, irregularity of sequence numbers, higher than expected arrival rate of data, high error rate, an abnormality at a wireless local area network termination associated with a base station, an abnormality at tunnel endpoint in a core network node, an amount of data, a change of frequency band over a radio access, an event, a radio access event, a mobility set event, a bearer configuration, a time since a previous update of the security key and session duration, and a failed integrity check.

In an example, phase 402 comprises determining an irregularity of sequence numbers. The irregularity may be determined on the basis of received PDCP packets having irregular sequence numbers. Irregular in here means that the sequence numbers do not appear in their numbering order or do not appear even close to their numbering order but instead the disorder of sequence numbers is deep or random or outside of the expected numbering window. A form of irregularity considered in here is to repeatedly receive units of the same (constant) sequence number causing confusion.

In an example, phase 402 comprises determining a higher than expected arrival rate of data. The arrival rate of data may be determined on the basis of an arrival rate of PDCP PDUs from a given GTP tunnel on Xw interface. The arrival rate may be compared to a threshold value representing an expected arrival rate for determining whether the arrival rate is higher than expected.

In an example, phase 402 comprises determining a high error rate may. The high error rate may be determined on the basis of information indicating a high error rate. The information indicating a high error rate may be received from eNB.

In an example, phase 402 comprises determining an abnormality at a wireless local area network termination associated with a base station. The abnormality may be a misbehaviour of the interface Xw between the WT and the eNB.

In an example, phase 402 comprises determining an abnormality at tunnel endpoint in a core network node such as S-GW. The abnormality may be an abnormal behaviour of the interface S1 between the eNB and the S-GW.

In an example, phase 402 comprises determining a mobility set event. The mobility set event may comprise a change in a set of access points that belong to the mobility set. Accordingly, in the determined mobility set event one or more access points may have been removed from the mobility set and/or one or more access points may have been added to the mobility set. The mobility set event may be determined by comparing a new and a previous mobility set with each other. Phase 404 may comprise checking if the compared mobility sets are different. Phase 406 may comprise triggering of the update if the mobility sets are different.

In an example, phase 402 comprises determining a change of frequency band over a radio access. The radio access may comprise a WLAN radio link, whereby the frequency band may be changed from one WLAN frequency band to another frequency band, for example from the 2.4 GHz WLAN frequency band to the 5 GHz WLAN frequency band or to the 60 GHz WLAN frequency band. The change of a frequency band may be determined by comparing a new and a previous frequency band with each other. Phase 404 may comprise checking if the compared frequency bands are different. Phase 406 may comprise triggering of the update if the frequency bands are different.

In an embodiment an update of a security key may be triggered at an event. the event may be associated with the bearer. Examples of events comprise a mobility set event and a radio access event. Accordingly, phase 402 may comprise determining an event. Phase 404 may comprise evaluate the determined event for finding whether the event meets at least one triggering condition. Phase 406 may comprise triggering of the update, when the triggering condition is met. For example, on determining in phase 402 that a radio access event and in phase 404 that the radio access event is evaluated to indicate that radio access is switched from one radio access to another radio access, in phase 406 the update may be triggered.

In an embodiment an update of a security key may be triggered periodically, when at least one uplink bearer is configured. In this way the frequency of the security key updating may be controlled particularly when any uplink bearers are configured. Uplink bearers may be susceptible to attacks particularly, when UE is intended to send traffic over the uplink bearer and a malicious UE is present. In an example, Phase 404 may comprise checking if a time since a previous update of the security key has reached a threshold. Phase 406 may comprise triggering of the update if the threshold has been reached. In this way the security key may be updated particularly in the presence of uplink bearers that may be vulnerable to attacks from malicious UE.

In an embodiment, an update 406 of a security key may be triggered if a session over the radio accesses lasts longer than a threshold, when only downlink bearers are configured. This may be sufficient because UL traffic should not be delivered to the base station, when only downlink bearers are configured. In an example, phase 404 may comprise checking if session duration has reached a threshold. Phase 406 may comprise triggering of the update if the threshold has been reached. In this way the security key may be updated on the basis of the duration of a particular session utilizing the bearer. Updating of the security key on the basis of the session duration may be sufficient since there are no uplink bearers that malicious UE could use in attacks.

Figure 5:
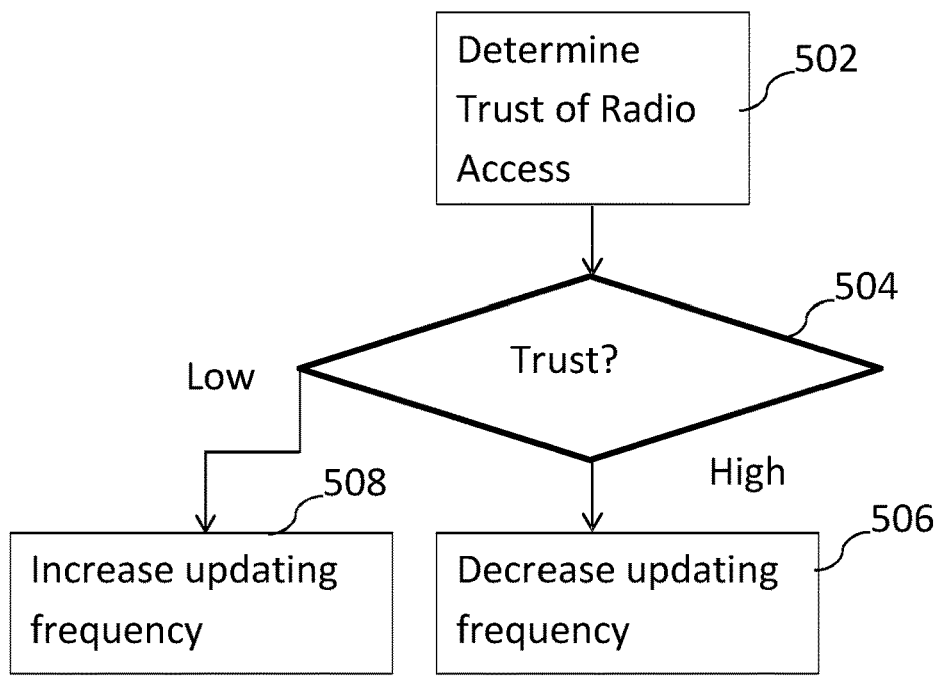
FIG. 5 illustrates an example of adapting security key updating on the basis of trust level in accordance with at least some embodiments of the present invention.

FIG. 5 illustrates an example of adapting security key updating on the basis of trust level in accordance with at least some embodiments of the present invention. The phases of the illustrated method may be performed in a base station 120, in a node connected to base station, or in a control device configured to control the functioning of the baser station or the node connected to the base station. In one example the node connected to the base station may be a WT.

Phase 502 comprise determining a level of trust of the at least one radio access on the basis of the radio access being provided by a third party access point or a private access point. Phase 504 may comprise evaluating the determined level of trust. Phases 506 and 508 comprise adapting a frequency of updating the security key on the basis of the level of trust of the at least one radio access. In one example, phase 508 comprises increasing the frequency of updating the security key if the level of trust is low, such as when the radio access is provided by a third party access point. In one example, phase 506 comprises decreasing the frequency of updating the security key if the level of trust is high, such as when the radio access is provided by a private access point. Adaptation of the frequency of updating the security key provides that the signaling related to the updating and possible data interruptions may be reduced.

Figure 6:
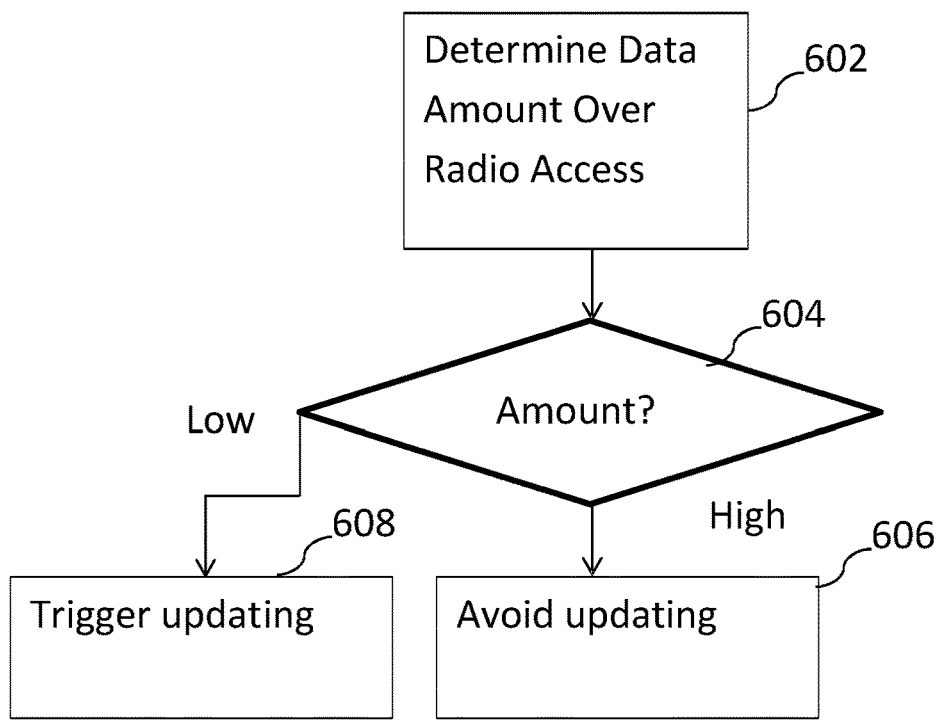
FIG. 6 illustrates an example of adapting security key updating on the basis of data amount over a radio access in accordance with at least some embodiments of the present invention.

FIG. 6 illustrates an example of adapting security key updating on the basis of data amount over a radio access in accordance with at least some embodiments of the present invention. The phases of the illustrated method may be performed in a base station 120, in a node connected to base station, or in a control device configured to control the functioning of the baser station or the node connected to the base station. In one example the node connected to the base station may be a WT.

Phase 602 comprises determining an amount of data over the at least one radio access. In one example the amount of data may be determined on the basis of transmission and/or reception buffer status. Phase 604 may comprise evaluating the determined amount of data. Phases 606, 608 comprise adapting a frequency of updating the security key on the basis of the determined amount of data. In one example, phase 604 comprises avoiding the update if the amount of data is high, such as when the data is video streaming in uplink and/or downlink radio link. Alternatively or additionally, phase 606 may comprise delaying and/or preventing the updating. In one example, phase 608 comprises triggering the update if the amount of data is low, such as when there is no data traffic or the amount of data is very low. In some situations, the update may trigger for every message or a unit of data when the arrival rate of data is infrequent resulting to a low data rate. In some situations such rare arrivals or low rates of data may result delaying and/or preventing the update. In some situations the update may be delayed and/or prevented to be triggered if the data rate becomes comparably reduced from what it was or from what it typically (in average) is. Respectively, the updates may become more frequent when the data unit arrival rate increases, data rate becomes increased from what it was or from what it typically (in average) is. Adaptation of the frequency of updating the security key provides that the signaling related to the updating and possible data interruptions may be reduced.

Figure 7:
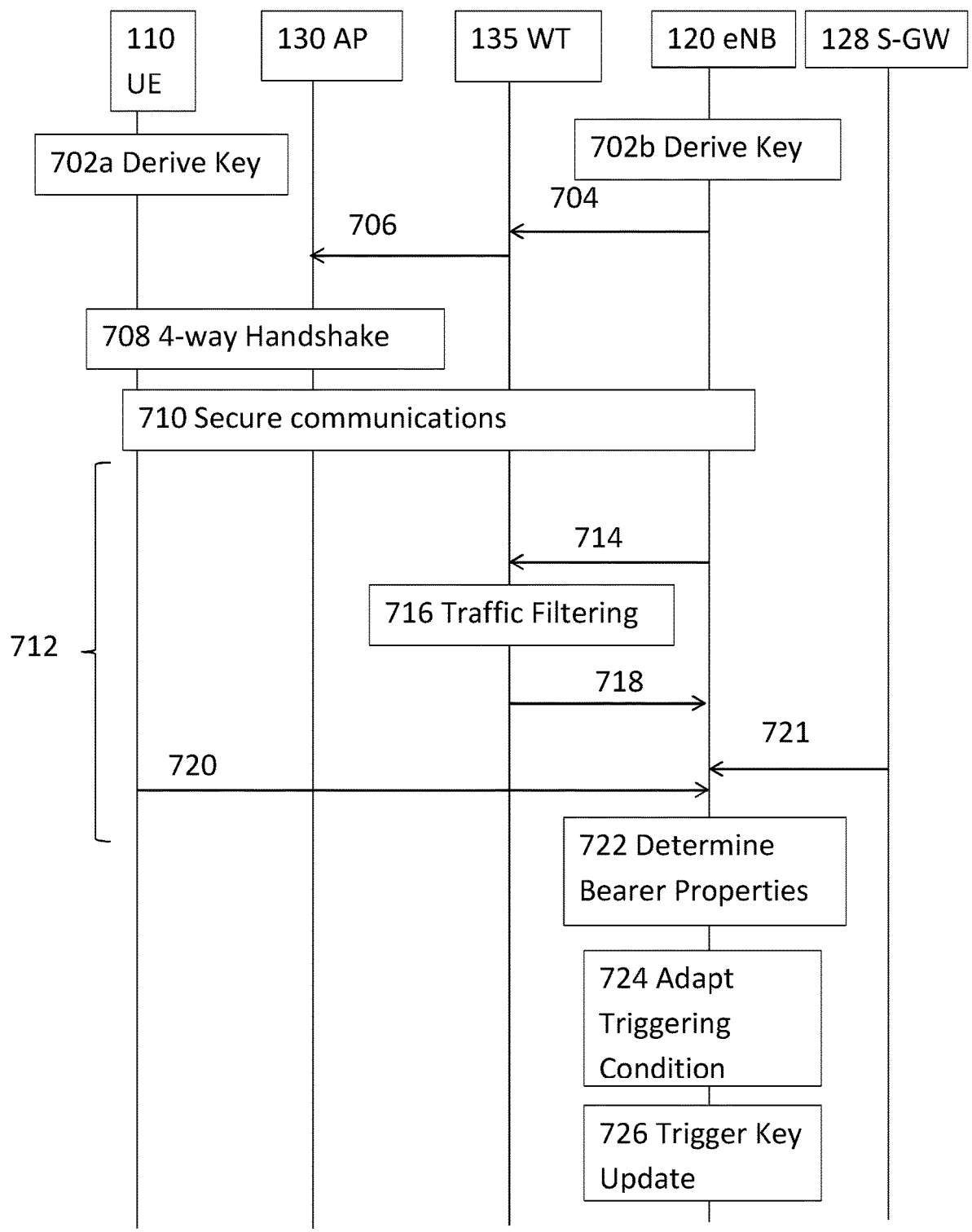
FIG. 7 illustrates a sequence in accordance with at least some embodiments of the present invention.

FIG. 7 illustrates a sequence in accordance with at least some embodiments of the present invention. The sequence includes functionalities performed by device 110, base station 120, an access point 130, a WT and S-GW illustrated in FIG. 1.

Initially one or more bearers may be established between the UE and the S-GW. The bearers may comprise a radio bearer and a core network bearer. Establishing the bearers may comprise generating a security association between devices communicating on the bearer. The security association may be generated by deriving 702a, 702b one or more security keys securing communications as described in Section G.2.4 in of 3GPP TS 33.401 V13.3.0 (2016-06). In an example described in the context of the TS 33.401, the eNB may derive 702b a security key $S\text{-}K_{WT}$ from a base key, $K_{eNB}$, and a WT counter. The eNB sends the $S\text{-}K_{WT}$ 704 to the WT via a secured Xw interface between the eNB and WT. The WT distributes the keys 706 to the APs or Access Controllers which belong to the WLAN architecture, which can form a UE WLAN mobility set as configured by the eNB RRC for the UE. The UE derives 702a the same $S\text{-}K_{WT}$ key autonomously based on WT Counter received from the eNB and from the $K_{eNB}$ which is known by the UE for PDCP ciphering between the UE and the eNB. The $S\text{-}K_{WT}$ is used by the UE as the Pairwise Master Key (PMK) with the WLAN network in four-way handshake 708 as defined in IEEE 802.11. Whenever the $S\text{-}K_{WT}$ key is updated, the WLAN security should be refreshed too. Accordingly, after $S\text{-}K_{WT}$ is updated, the four-way handshake may be executed and the transient keys may be derived from the PMK for traffic encryption. The four-way handshake allows to verify that the access point (or authenticator) and wireless client (or supplicant) can independently prove to each other that they know the PSK/PMK, without ever disclosing the key. Instead of disclosing the key, the access point & client each encrypt messages to each other—that can only be decrypted by using the PMK that they already share—and if decryption of the messages was successful, this proves knowledge of the PMK. After the security association has been generated, data may be communicated 710 securely over at least one of the radio links of the bearer.

Once the bearer has been established and at least one security key is utilized for securing communications on at least one of the radio links, the bearer may be monitored 712 for determining 722 one or more properties of the bearer, for example as described in a method of FIG. 2. The monitoring 712 may be centralized and/or distributed between the device 110, base station 120, access point 130, WT and S-GW. In distributed monitoring one or more functionalities related to the monitoring may be performed by at least one of the device 110, base station 120, access point 130 and WT.

In an embodiment a report 720 may be obtained from the UE, said report indicating invalid mapping of packets to active flows. The UE may be caused to send the report as part of monitoring performed by the UE or a functionality supporting monitoring 712 performed by the eNB.

In an embodiment a report 721 may be obtained from the S-GW, said report indicating an abnormality at the S-GW that is tunnel endpoint. The abnormality may be an abnormal behaviour of the interface S1 between the eNB and the S-GW.

In an embodiment, the WT is provided with information 714 for performing traffic filtering 716. The information for performing traffic filtering may comprise at least one of flow direction and bearer configuration. The WT may determine one or more properties of the monitored bearer on the basis of the results of the traffic filtering. Information 718 indicating the determined properties may be sent to the eNB for determining whether the determined properties meet at least one triggering condition capable of indicating a need for the update and for triggering update of the security key by the eNB. Alternatively, the WT may determine whether the determined meet at least one triggering condition capable of indicating a need for the update. If the WT determines that the determined properties meet the at least one triggering condition capable of indicating a need for the update, the update of the security key may be triggered by a request 718. In this way the WT may be caused to perform monitoring performed by the WT or a functionality supporting monitoring 712 performed by the eNB.

In an embodiment a triggering condition may be adapted 724 on the basis of one or more determined properties of the monitored bearer. In an example described with FIG. 5, a triggering condition may comprise a frequency of updating the security key and the determined properties comprise a level of trust of at least one radio access, whereby the frequency of updating may be adapted 724 on the basis of the determined level of trust of the at least one radio access.

In an embodiment an update of the security key utilized for securing communications on at least one of the radio accesses may be triggered 726 in response to information and/or one or more reports obtained in the monitoring 712. In some embodiments, the update may be triggered after adapting 724 the triggering condition and/or determining that at least one triggering condition capable of indicating a need for the update is met by determined properties of the monitored bearer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

3GPP 3rd Generation Partnership Project
5G $5^{th}$ generation, a cellular technology
eNB evolved NodeB
GPRS general packet radio service
GRE Generic Routing Encapsulation
GTP-u GPRS tunnelling protocol for user plane
IETF Internet Engineering Task Force IEEE Institute of Electrical and Electronics Engineers
IPsec internet protocol security
LTE long term evolution
LWAAP LWA adaptation protocol
LWA LTE-WLAN aggregation
LWIP LTE-WLAN radio level integration with IPsec tunnel
LWIPEP LWIP encapsulation protocol
MME mobility management entity
PDCP packet data convergence protocol
PDU protocol data unit
S-GW serving gateway (also "SGW")
UE user equipment
WCDMA wideband code division multiple access
WiMAX worldwide interoperability for microwave access
WLAN wireless local area network
WT WLAN termination

REFERENCE SIGNS LIST

| | |
|---|---|
| 110 | Device (e.g. a smartphone) |
| 112 | first radio access (cellular) |
| 113 | second radio access (non-cellular) |
| 120 | Base station |
| 122 | core network bearer |
| 123 | Interface |
| 124 | radio bearer |
| 126 | interface |
| 128 | S-GW |
| 130 | Access point |
| 135 | WLAN termination |
| 140 | Core network |
| 142 | radio access network |
| 202-206 | Phases of the method of FIG. 2 |
| 300-340 | Structure of the apparatus of FIG. 3 |
| 402-406 | Phases of the method of FIG. 4 |
| 502-508 | Phases of the method of FIG. 5 |
| 602-608 | Phases of the methods of FIG. 6 |
| 702a-726 | Phases of the sequence of FIG. 7 |

The invention claimed is:

1. An apparatus comprising:
 at least one processor; and
 at least one memory including computer program code;
 the at least one memory and the computer program code configured to, with the at least one processor, cause the apparatus to at least perform:
  monitoring at least one bearer comprising a first and second radio accesses according to different radio technologies between user equipment and a communications network;
  determining one or more properties of the monitored bearer;
 determining a level of trust based on the monitoring the at least one bearer; and
  triggering an update of a security key utilized for securing communications over at least one of the radio accesses in response to determining that the determined properties meet at least one triggering condition capable of indicating a need for the update,
 wherein a threshold of the triggering is variable depending on the level of trust, and
 wherein the triggering causes updating the security key for one radio access on the basis of the base key for securing communications on another radio access.

2. The apparatus according to claim 1, wherein the one or more properties comprise at least one of an invalid bearer mapping, irregularity of sequence numbers, higher than expected arrival rate of data, high error rate, an abnormality at a wireless local area network termination associated with a base station, an abnormality at tunnel endpoint in a core network node, an amount of data, a change of frequency band over a radio access, an event, a radio access event, a mobility set event, a bearer configuration, a time since a previous update of the security key and session duration, and a failed integrity check.

3. The apparatus according to claim 1, wherein the update of a security key is triggered periodically, when at least one uplink bearer is configured.

4. The apparatus according to claim 1, wherein the update of a security key is triggered if a session over the radio accesses lasts longer than a threshold time duration, when only downlink bearers are configured.

5. The apparatus according to claim 1, wherein the update of a security key is triggered in response to report from user equipment, said report indicating invalid mapping of packets to active flows.

6. The apparatus according to claim 1, wherein the update of a security key is triggered in response to report from a tunnel endpoint in the core network, said report indicating invalid mapping of packets to active flows.

7. The apparatus according to claim 1, wherein the apparatus is caused to send information to a wireless local area network termination, said information comprising at least one of flow direction and bearer configuration.

8. The apparatus according to claim 1, wherein the level of trust of the at least one radio access is determined on the basis of the radio access being provided by a third party access point or a private access point and a frequency of updating the security key is adapted on the basis of the determined level of trust of the at least one radio access.

9. The apparatus according to claim 1, wherein an amount of data over the at least one radio access is determined and a frequency of updating the security key is adapted on the basis of the determined amount of data.

10. The apparatus according to claim 1, wherein the radio accesses comprise a cellular radio link and a non-cellular radio link.

11. The apparatus according to claim 1, wherein the apparatus is an Evolved NodeB.

12. The apparatus according to claim 1, wherein the bearer comprises at least one of a radio bearer and a core network bearer.

13. A method, comprising:
 monitoring at least one bearer comprising a first and second radio accesses according to different radio technologies between user equipment and a communications network;
 determining one or more properties of the monitored bearer;
 determining a level of trust based on the monitoring the at least one bearer; and
 triggering an update of a security key utilized for securing communications over at least one of the radio accesses in response to determining that the determined properties meet at least one triggering condition capable of indicating a need for the update,
 wherein a threshold of the triggering is variable depending on the level of trust, and
 wherein the triggering causes updating the security key for one radio access on the basis of the base key for securing communications on another radio access.

14. The method according to claim 13, wherein the one or more properties comprise at least one of an invalid bearer mapping, irregularity of sequence numbers, higher than expected arrival rate of data, high error rate, an abnormality at a wireless local area network termination associated with a base station, an abnormality at tunnel endpoint in a core network node, an amount of data, a change of frequency band over a radio access, an event, a radio access event, a mobility set event, a bearer configuration, a time since a previous update of the security key and session duration, and a failed integrity check.

15. The method according to claim 13, wherein the update of a security key is triggered periodically, when at least one uplink bearer is configured.

16. The method according to claim 13, wherein the update of a security key is triggered if a session over the radio accesses lasts longer than a threshold, when only downlink bearers are configured.

17. The method according to claim 13, wherein the update of a security key is triggered in response to report from user equipment, said report indicating invalid mapping of packets to active flows.

18. The method according to claim 13, wherein the update of a security key is triggered in response to report from a tunnel endpoint in the core network, said report indicating invalid mapping of packets to active flows.

19. A non-transitory computer readable medium comprising program instructions for causing an apparatus to perform at least the following:

monitoring at least one bearer comprising a first and second radio accesses according to different radio technologies between user equipment and a communications network;

determining one or more properties of the monitored bearer;

determining a level of trust based on the monitoring the at least one bearer; and triggering an update of a security key utilized for securing communications over at least one of the radio accesses in response to determining that the determined properties meet at least one triggering condition capable of indicating a need for the update, wherein a threshold of the triggering is variable depending on the level of trust, and wherein the triggering causes updating the security key for one radio access on the basis of the base key for securing communications on another radio access.

* * * * *